United States Patent
Kamiya

(10) Patent No.: US 9,701,832 B2
(45) Date of Patent: Jul. 11, 2017

(54) VIBRATION DAMPER AND POLYMER COMPOSITION

(71) Applicant: Mitsui Chemicals, Inc., Tokyo (JP)

(72) Inventor: Nozomi Kamiya, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/903,767

(22) PCT Filed: Jul. 3, 2014

(86) PCT No.: PCT/JP2014/067821
§ 371 (c)(1),
(2) Date: Jan. 8, 2016

(87) PCT Pub. No.: WO2015/005226
PCT Pub. Date: Jan. 15, 2015

(65) Prior Publication Data
US 2016/0152818 A1 Jun. 2, 2016

(30) Foreign Application Priority Data

Jul. 11, 2013 (JP) .................................. 2013-145582

(51) Int. Cl.
  C08L 53/02 (2006.01)
  C08L 23/08 (2006.01)
  C08L 23/16 (2006.01)

(52) U.S. Cl.
  CPC ........... *C08L 53/02* (2013.01); *C08L 23/0815* (2013.01); *C08L 23/16* (2013.01); *C08L 53/025* (2013.01)

(58) Field of Classification Search
None
See application file for complete search history.

(56) References Cited

U.S. PATENT DOCUMENTS

| | | | |
|---|---|---|---|
| 3,780,128 A | 12/1973 | Shubkin | |
| 4,032,591 A | 6/1977 | Cupples et al. | |
| 4,704,491 A | 11/1987 | Tsutsui et al. | |
| 4,814,386 A * | 3/1989 | Hellermann | ......... B60C 1/0016 152/905 |
| 4,840,739 A * | 6/1989 | Mori | ................... C10M 169/00 508/131 |
| 4,956,512 A | 9/1990 | Nissfolk et al. | |
| 5,599,885 A | 2/1997 | Kawasaki et al. | |
| 6,459,005 B1 | 10/2002 | Hirano et al. | |
| 6,858,675 B1 * | 2/2005 | Taguchi | ................... C08L 21/00 525/191 |
| 2002/0055445 A1 | 5/2002 | Okada et al. | |
| 2003/0027880 A1 * | 2/2003 | Tasaka | ................... C08J 9/0061 521/82 |
| 2004/0239735 A1 | 12/2004 | Mashita et al. | |
| 2007/0225427 A1 * | 9/2007 | Wright | ................... C08F 297/04 524/505 |
| 2012/0177877 A1 * | 7/2012 | Lebail | ................. B29C 44/1228 428/116 |
| 2015/0183969 A1 | 7/2015 | Tanaka et al. | |

FOREIGN PATENT DOCUMENTS

| | | |
|---|---|---|
| JP | S62-121710 A | 6/1987 |
| JP | H01-163136 A | 6/1989 |
| JP | H06-263821 A | 9/1994 |
| JP | H11-005875 A | 1/1999 |
| JP | 2000-169826 A | 6/2000 |
| JP | 2000-351813 A | 12/2000 |
| JP | 2001-026663 A | 1/2001 |
| JP | 2007-204676 A | 8/2007 |
| JP | 2010-180325 A | 8/2010 |
| WO | WO-00/34420 A1 | 6/2000 |
| WO | WO-03/027183 A1 | 4/2003 |
| WO | WO-2013/168635 A1 | 11/2013 |

OTHER PUBLICATIONS

Tanaka, electronic translation of the specifcation of JP 2013-234222, Nov. 21, 2013.*
Tanaka, Derwent Abstract of WO 2013/168635, Nov. 14, 2013.*
International Search Report for PCT/JP2014/067821 mailed Sep. 9, 2014.
Excerpt from "Japanese-English Dictionary Comprising 450,000 Words of Technical Terms," Nichigai Associates, Inc., p. 2084 (2001).

(Continued)

*Primary Examiner* — Jeffrey Mullis
(74) *Attorney, Agent, or Firm* — Foley & Lardner LLP

(57) ABSTRACT

A vibration damper of the invention is formed from a polymer composition including (a) 100 parts by weight of a block copolymer including a polymer segment mainly derived from a vinyl aromatic compound and a polymer segment mainly derived from a conjugated diene compound, or a hydrogenated product of the copolymer, (b) 30 to 200 parts by weight of an ethylene.α-olefin copolymer having a kinematic viscosity at 100° C. of 300 to 5000 mm$^2$/s and an ethylene structural unit content of 30 to 80 mol %, and (c) 0 to 100 parts by weight of a polyolefin resin having a MFR of 0.1 to 500 g/10 min. According to the present invention, vibration dampers are provided which exhibit excellent vibration damping properties and transparency and show excellent weather resistance with little discoloration, and polymer compositions are provided which are suited for the production of vibration dampers having excellent vibration damping properties and weather resistance.

10 Claims, 1 Drawing Sheet

(56) References Cited

OTHER PUBLICATIONS

English-Language Machine Translation of Paragraphs [0043]-[0046] of International Patent Publication No. 2013/168635, published Nov. 14, 2013.
Yamada, Journal of the Society of Rubber Science and Technology 52(2):122-130 (1979).

* cited by examiner

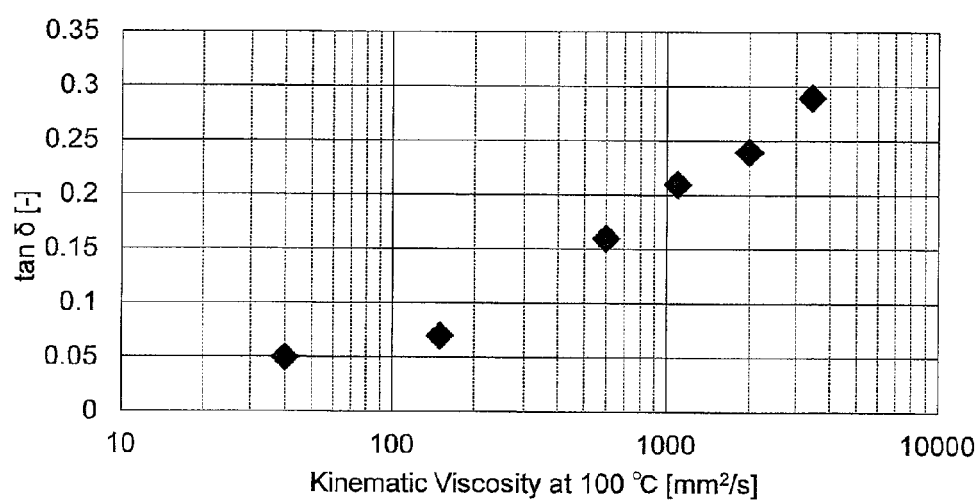

VIBRATION DAMPER AND POLYMER COMPOSITION

TECHNICAL FIELD

The present invention relates to vibration dampers and to polymer compositions suited for the formation of vibration dampers.

BACKGROUND ART

The noise and vibration associated with the recent development of the modes of transportation such as automobiles have become serious social problems. Further, there have been sophisticated needs that the vibration and noise experienced inside automobiles be reduced. Furthermore, the use of office machines such as copiers and printers has expanded to ordinary households, and the reduction of the noise and vibration generated by these machines has become an important challenge. Still further, home electric appliances have been enlarged to meet changes in lifestyle, and the quietness by reducing the vibration and noise of appliances that vibrate such as refrigerators, washing machines and vacuum cleaners is one of the important performances of the products.

A conventional approach to reducing such vibration and noise is to use various insulators such as springs and vibration insulating rubbers. This approach aims to reduce the generation of vibration and noise by insulating the transfer of vibration, but has been unsuccessful in satisfying the various demands mentioned above.

Another method that has become increasingly widespread is the so-called vibration damping that suppresses the vibration itself from the sources such as machines. Specifically, various viscoelastic bodies as vibration dampers are applied to or inserted between the vibration sources to suppress the occurrence of vibration. For example, known vibration dampers used for this purpose are block copolymers including diene monomer blocks and aromatic vinyl monomer blocks.

However, such block copolymers sometimes fail to exhibit a sufficient vibration damping performance due to factors such as changes in ambient temperature during actual use.

Patent Literature 1 describes a vibration insulator used to insulate the vibration of lightweight instrument which includes a nonaromatic rubber softener for the purpose of decreasing the hardness of a thermoplastic elastomer such as a hydrogenated styrene-butadiene-styrene block copolymer. However, this literature is silent with respect to vibration damping properties, and studies using the softener specifically disclosed in the literature have found that the vibration damping performance is insufficient. Further, weather resistance is poor depending on the types of softeners.

Patent Literature 2 describes a resin composition including an isobutylene block copolymer and a polyolefin resin and having low hardness and high loss properties (vibration damping properties) as well as good gas permeability. This literature describes that a nonaromatic rubber softener is added in order to further decrease hardness. However, studies using the softener specifically disclosed in the literature have found that the vibration damping performance is insufficient. Further, weather resistance is not satisfactory depending on the types of softeners.

CITATION LIST

Patent Literature

Patent Literature 1: JP-A-2000-169826
Patent Literature 2: WO 2003/27183

SUMMARY OF INVENTION

Technical Problem

An object of the present invention is to provide vibration dampers having excellent vibration damping properties and weather resistance, and polymer compositions having excellent vibration damping properties and suitably used for vibration damping applications.

Solution to Problem

Aspects of the present invention reside in the following [1] to [12].

[1] A vibration damper formed from a polymer composition, the polymer composition including:

(a) 100 parts by weight of a block copolymer including a polymer segment mainly derived from a vinyl aromatic compound and a polymer segment mainly derived from a conjugated diene compound, or a hydrogenated product of the copolymer, (b) 30 to 200 parts by weight of an ethylene.α-olefin copolymer having a kinematic viscosity at 100° C. of 300 to 5000 mm$^2$/s and an ethylene structural unit content of 30 to 80 mol %, and (c) 0 to 100 parts by weight of a polyolefin resin having a MFR of 0.1 to 500 g/10 min.

[2] The vibration damper described in [1], wherein the loss tangent tan δ of the dynamic viscoelasticity of the polymer composition measured at 0° C. and a frequency of 1 Hz is not less than 0.10.

[3] The vibration damper described in [1] or [2], wherein the block copolymer or the hydrogenated product thereof (a) is a hydrogenated product of a block copolymer including a polymer segment mainly derived from a vinyl aromatic compound and a polymer segment mainly derived from a conjugated diene compound.

[4] The vibration damper described in any of [1] to [3], wherein the kinematic viscosity of the ethylene.α-olefin copolymer (b) at 100° C. is 500 to 3500 mm$^2$/s.

[5] The vibration damper described in any of [1] to [4], wherein the polyolefin resin (c) is a polypropylene resin.

[6] The vibration damper described in any of [1] to [5], wherein the polymer composition includes 100 parts by weight of the block copolymer or the hydrogenated product thereof (a), 50 to 150 parts by weight of the ethylene.α-olefin copolymer (b) and 1 to 60 parts by weight of the polyolefin resin (c).

[7] A polymer composition including:

(a) 100 parts by weight of a block copolymer including a polymer segment mainly derived from a vinyl aromatic compound and a polymer segment mainly derived from a conjugated diene compound, or a hydrogenated product of the copolymer, (b) 30 to 200 parts by weight of an ethylene.α-olefin copolymer having a kinematic viscosity at 100° C. of 300 to 5000 mm$^2$/s and an ethylene structural unit content of 30 to 80 mol %, and (c) 0 to 100 parts by weight of a polyolefin resin having a MFR of 0.1 to 500 g/10 min, the polymer composition having a loss tangent tan δ of dynamic viscoelasticity measured at 0° C. and a frequency of 1 Hz of not less than 0.10.

[8] The polymer composition described in [7], which is used for the formation of a vibration damper.

[9] The polymer composition described in [7] or [8], wherein the block copolymer or the hydrogenated product thereof (a) is a hydrogenated product of a block copolymer including a polymer segment mainly derived from a vinyl aromatic compound and a polymer segment mainly derived from a conjugated diene compound.

[10] The polymer composition described in any of [7] to [9], wherein the kinematic viscosity of the ethylene.α-olefin copolymer (b) at 100° C. is 500 to 3500 mm$^2$/s.

[11] The polymer composition described in any of [7] to [10], wherein the polyolefin resin (c) is a polypropylene resin.

[12] The polymer composition described in any of [7] to [11], wherein the polymer composition includes 100 parts by weight of the block copolymer or the hydrogenated product thereof (a), 50 to 150 parts by weight of the ethylene.α-olefin copolymer (b) and 1 to 60 parts by weight of the polyolefin resin (c).

Advantageous Effects of Invention

The vibration dampers provided according to the invention exhibit excellent vibration damping properties and transparency and show excellent weather resistance with little discoloration. The polymer compositions of the invention are suited for the production of vibration dampers having excellent vibration damping properties and weather resistance.

BRIEF DESCRIPTION OF DRAWING

FIG. 1 is a graph showing changes in loss tangent tan δ of polymer compositions of Examples and Comparative Examples including 100 parts by weight of SEPS (SEPTON 2007 manufactured by KURARAY CO., LTD.) as the component (a) and 100 parts by weight of an ethylene.α-olefin copolymer as the component (b), plotted versus the kinematic viscosity of the ethylene.α-olefin copolymer (b) at 100° C.

DESCRIPTION OF EMBODIMENTS

The present invention will be described in detail hereinbelow. In the following description, the term "to" used in numerical ranges indicates that the values before and after the term are included in the ranges unless otherwise specified.

A vibration damper according to the invention is formed from a polymer composition of the invention described below. The polymer composition of the invention may be used in various applications, and may be used particularly suitably in the production of vibration dampers due to its excellent vibration damping performance.

⟨Polymer Compositions⟩

The polymer composition of the invention includes (a) a block copolymer including a polymer segment mainly derived from a vinyl aromatic compound and a polymer segment mainly derived from a conjugated diene compound, or a hydrogenated product of the copolymer, (b) an ethylene.α-olefin copolymer having a kinematic viscosity at 100° C. of 300 to 5000 mm$^2$/s and an ethylene structural unit content of 30 to 80 mol %, and optionally (c) a polyolefin resin having a MFR of 0.1 to 500 g/10 min.

(a) Block Copolymer Including a Polymer Segment Mainly Derived from a Vinyl Aromatic Compound and a Polymer Segment Mainly Derived from a Conjugated Diene Compound, or Hydrogenated Product Thereof In the polymer composition of the invention, the component (a) is a block copolymer or a hydrogenated product thereof. The block copolymer includes a polymer segment mainly derived from a vinyl aromatic compound (hereinafter, also written as the "polymer segment (A)") and a polymer segment mainly derived from a conjugated diene compound (hereinafter, also written as the "polymer segment (B)"). Hereinbelow, the copolymer is also written as the "(A)/(B) block copolymer".

Specific examples of the vinyl aromatic compounds for constituting the polymer segments (A) include styrene, α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, monochlorostyrene, dichlorostyrene, methoxystyrene, indene and acenaphthylene. One, or two or more of these vinyl aromatic compounds may be used. Of these, styrene is most preferable.

Preferred conjugated diene compound for constituting the polymer segments (B) are those conjugated dienes having 4 to 20 carbon atoms, with specific examples including butadiene, isoprene and hexadiene. One, or two or more of such conjugated diene compound may be used. Of these, butadiene and isoprene are most preferable.

The (A)/(B) block copolymer including the polymer segment (A) and the polymer segment (B) preferably has a weight average molecular weight (Mw) of 30,000 to 500,000, and more preferably 50,000 to 300,000 as measured by GPC relative to polystyrene. When the weight average molecular weight of the (A)/(B) block copolymer is 30,000 or above, the polymer composition can give molded articles having enhanced mechanical characteristics. With the molecular weight being 500,000 or less, good molding processability may be obtained.

In the (A)/(B) block copolymer, the proportions of the polymer segment (A) and the polymer segment (B) may be varied depending on factors such as the number average molecular weight of the (A)/(B) block copolymer and the number average molecular weights of the polymer segment (A) and the polymer segment (B). It is, however, generally preferable that the proportion of the polymer segment (A) be 5 to 80 wt % and that of the polymer segment (B) be 20 to 95 wt % of the weight of the (A)/(B) block copolymer. More preferably, the polymer segment (A) represents 10 to 75 wt % and the polymer segment (B) represents 25 to 90 wt %, and still more preferably the polymer segment (A) represents 20 to 40 wt % and the polymer segment (B) represents 60 to 80 wt %. When the proportion of the polymer segment (A) is 5 wt % or more (in other words, when the proportion of the polymer segment (B) is 95 wt % or less) in the (A)/(B) block copolymer, the polymer composition including the (A)/(B) block copolymer and molded articles obtained from the composition exhibit good mechanical properties. When, on the other hand, the proportion of the polymer segment (A) is 80 wt % or less (in other words, when the proportion of the polymer segment (B) is 20 wt % or more), an excessive increase in melt viscosity may be prevented and molding processability may be obtained.

The (A)/(B) block copolymer may be linear or may have two or more branches. The structure of the copolymer is not particularly limited as long as the copolymer has at least one polymer segment (A) and at least one polymer segment (B) in the molecule. From the point of view of the balance of mechanical characteristics, heat resistance and molding processability, an A-B-A triblock structure is particularly preferable.

Specific examples include styrene-butadiene-styrene block copolymer, styrene-isoprene-styrene block copolymer, and styrene-butadiene/isoprene-styrene block copolymer. Here, for example, the styrene-butadiene-styrene block copolymer is a block copolymer in the form of polystyrene block-polybutadiene block-polystyrene block.

The (A)/(B) block copolymer may be produced by any method without limitation. For example, it may be produced by sequentially polymerizing a vinyl aromatic compound such as styrene and a conjugated diene compound such as butadiene in an inert solvent with use of an appropriate polymerization initiator system. Examples of the polymerization initiator systems used herein include mixtures of a Lewis acid and an organic compound that can forma cationic polymerization active species by the reaction with the Lewis acid. Examples of the Lewis acids include titanium tetrachloride, tin tetrachloride, boron trichloride and aluminum chloride. Examples of the organic compounds include organic compounds having such functional groups as alkoxy groups, acyloxy groups and halogens, for example, bis(2-methoxy-2-propyl)benzene, bis(2-acetoxy-2-propyl)benzene and bis(2-chloro-2-propyl)benzene. Further, the Lewis acid and the organic compound may be used optionally in combination with a third component, for example, an amide such as N,N-dimethylacetamide or an ester such as ethyl acetate. Examples of the inert solvents used in the polymerization include hexane, cyclohexane, methylcyclohexane, methyl chloride and methylene chloride.

For example, a linear (A)/(B) block copolymer may be produced by a method (1) in which, in the presence of a polymerization initiator system that includes a Lewis acid and a compound having one functional group used in the formation of a cationic polymerization active species, a vinyl aromatic compound is polymerized to form a polymer segment (A), thereafter a conjugated diene compound is added to the reaction system and is polymerized to form a polymer segment (B), and optionally a vinyl aromatic compound is further added and polymerized to form a polymer block (A), or a method (2) in which, in the presence of a polymerization initiator system that includes a Lewis acid and a compound having two functional groups used in the formation of cationic polymerization active species, a conjugated diene compound is polymerized first to form a polymer segment (B) and thereafter a vinyl aromatic compound is added to the reaction system and is polymerized to form a polymer segment (A).

For example, a branched (A)/(B) block copolymer may be produced by a method in which, in the presence of a polymerization initiator system that includes a Lewis acid and a compound having three or more functional groups used in the formation of cationic polymerization active species, a conjugated diene compound is polymerized first to form a polymer segment (B) and thereafter a vinyl aromatic compound is added and polymerized to form a polymer segment (A).

In the polymer composition of the invention, the component (a) may be a hydrogenated product of the (A)/(B) block copolymer. The use of such a hydrogenated product is advantageous in that heat resistance and weather resistance are enhanced as a result of the decrease in the number of the aliphatic double bonds in the A/B block copolymer by the hydrogenation.

In the invention, the hydrogenated product of the (A)/(B) block copolymer used as the component (a) is suitably such that 90% to 100% of the aliphatic double bonds in the (A)/(B) block copolymer have been hydrogenated and 0% to 10% of the aromatic double bonds of the copolymer have been hydrogenated. Particularly preferably, 99 to 100% of the aliphatic double bonds have been hydrogenated and 0% to 5% of the aromatic double bonds have been hydrogenated. In such a hydrogenated product of the (A)/(B) block copolymer, the polymer segment (B) after the hydrogenation of its aliphatic double bonds substantially has a polyolefin structure.

The hydrogenation of the (A)/(B) block copolymer may be performed using a known method. Examples of the hydrogenation catalysts include nickel, porous diatomaceous earth, Raney nickel, copper dichromate, molybdenum sulfide, and supported catalysts such as platinum and palladium on carriers such as carbon.

The hydrogenation may be performed at any pressure (for example, atmospheric pressure to 300 atm, preferably 5 to 200 atm), at any temperature (for example, 20° C. to 350° C.) for any duration of time (for example, 0.2 hours to 10 hours).

The (A)/(B) block copolymer (a) of the invention may be a mixture of two or more kinds of (A)/(B) block copolymers having different properties such as molecular weight and styrene content.

The (A)/(B) block copolymer (a) may be purchased in the market. Examples of such copolymers without hydrogenation include "D SERIES" from Kraton, "TR SERIES" from JSR Corporation, and "TUFPRENE" and "ASAPRENE" from Asahi Kasei Chemicals Corporation. Examples of the hydrogenated products include "SEPTON" and "HYBRAR" from KURARAY CO., LTD., "TUFTEC" from Asahi Kasei Chemicals Corporation, "DYNARON" from JSR Corporation, and "G SERIES" from Kraton Polymers.

(b) Ethylene.α-Olefin Copolymer

The component (b) in the polymer composition according to the invention is an ethylene.α-olefin copolymer having a kinematic viscosity at 100° 0 of 300 to 5000 mm$^2$/s, preferably 500 to 3500 mm$^2$/s, more preferably 600 to 2500 mm$^2$/s, and still more preferably 900 to 2500 mm$^2$/s. When the ethylene.α-olefin copolymer (b) has a kinematic viscosity at 100° C. of 300 mm$^2$/s to 5000 mm$^2$/s, the obtainable polymer composition and vibration dampers exhibit a superior vibration damping performance.

The vibration damping performance of the polymer composition is probably attributed to a behavior in which ends of the molecules of the ethylene.α-olefin copolymer (b) are disentangled from the aforementioned block copolymer component (a) when the composition is subjected to vibration. If the kinematic viscosity of the ethylene.α-olefin copolymer (b) at 100° C. is less than 300 mm$^2$/s, the copolymer is less prone to be entangled with the block copolymer (a). Consequently, the block copolymer (a) and the ethylene.α-olefin copolymer (b) move independently rather than as an entangled mass, thus failing to exhibit sufficient vibration damping properties. If the kinematic viscosity exceeds 5000 mm$^2$/s, the number of molecular ends of the ethylene.α-olefin copolymer (b) per unit volume is relatively decreased and consequently the vibration damping performance is lowered. If the kinematic viscosity exceeds 5000 mm$^2$/s, the compatibility between the (A)/(B) block copolymer (a) and the ethylene.α-olefin copolymer (b) is sacrificed and consequently the vibration damping properties and the transparency are decreased.

When the kinematic viscosity of the ethylene.α-olefin copolymer (b) at 100° C. is 2500 mm²/s or less, the compatibility between the component (a) and the component (b) is enhanced and the obtainable polymer composition achieves high transparency. Good compatibility is probably advantageous also for vibration damping properties to be imparted to the composition.

The ethylene.α-olefin copolymer (b) has a structure similar to one resulting from the hydrogenation of the aliphatic double bonds in the polymer segment (B) of the (A)/(B) block copolymer (a), and therefore shows a readiness to form entanglements therewith. Due to this characteristic, the vibration damping performance is achieved easily.

In the ethylene.α-olefin copolymer as the component (b) in the polymer composition of the invention, the intrinsic viscosity [η] measured at 135° C. in decalin is not particularly limited but is preferably 0.01 dl/g to 0.5 dl/g, more preferably 0.05 dl/g to 0.4 dl/g, and particularly preferably 0.09 dl/g to 0.3 dl/g. When the intrinsic viscosity [η] measured at 135° C. in decalin is lowered, the copolymer is less prone to be entangled with the block copolymer (a). Consequently, the block copolymer (a) and the ethylene.α-olefin copolymer (b) move independently rather than as an entangled mass, causing a decrease in vibration damping properties. With an increase in the intrinsic viscosity [η] measured at 135° C. in decalin, the number of molecular ends of the ethylene.α-olefin copolymer (b) per unit volume is relatively decreased and consequently the vibration damping performance is lowered. An increase in the intrinsic viscosity [η] measured at 135° C. in decalin results in a decrease in the compatibility between the (A)/(B) block copolymer (a) and the ethylene.α-olefin copolymer (b), and consequently the vibration damping properties and the transparency are decreased.

In the ethylene.α-olefin copolymer (b) of the invention, the ethylene structural unit content is 30 to 80 mol %, preferably 40 to 75 mol %, and more preferably 40 to 60 mol %. If the ethylene content is excessively high or excessively low, the crystallinity is increased and consequently the polymer composition and vibration dampers are deteriorated in flexibility, low-temperature characteristics and vibration damping properties. Further, any excessively high or excessively low ethylene content results in poor compatibility between the (A)/(B) block copolymer (a) and the ethylene.α-olefin copolymer (b), and consequently the vibration damping properties and the transparency are decreased.

The ethylene content in the ethylene.α-olefin copolymer (b) may be measured by a $^{13}$C-NMR method. For example, the identification and quantification of peaks may be performed in accordance with a method described later and a method described in "Koubunshi Bunseki Handbook (Polymer Analysis Handbook)" (published from Asakura Publishing Co., Ltd., pp. 163-170).

Examples of the α-olefins for constituting the ethylene.α-olefin copolymer (b) include α-olefins having 3 to 20 carbon atoms such as propylene, butene-1, pentene-1, hexene-1, heptene-1, octene-1, decene-1, undecene-1, dodecene-1, tridecene-1, tetradecene-1, pentadecene-1, hexadecene-1, heptadecene-1, octadecene-1, nonadecene-1 and eicosene-1. Two or more kinds of these α-olefins may be present in the ethylene.α-olefin copolymer (b). In particular, those α-olefins having 3 to 10 carbon atoms are preferable, and propylene is particularly preferable because the use of such α-olefins imparts good flexibility, vibration damping properties and weather resistance to the polymer composition.

The molecular weight distribution (Mw/Mn) of the ethylene.α-olefin copolymer as the component (b) of the inventive polymer composition is not particularly limited but is usually 1.0 to 3.0, and preferably 1.4 to 2.5. The broadening of the molecular weight distribution (the increase in Mw/Mn) is not preferable because the copolymer contains a large amount of low-molecular components which are less prone to be entangled with the component (a) and a large amount of high-molecular components exhibiting poor compatibility with the component (a).

The ethylene.α-olefin copolymer (b) of the invention usually has a blockness (B value) determined by NMR of not less than 0.9, and preferably not less than 1.0. The B value is a parameter showing the randomness of the comonomer sequence distribution. A decrease in the B value indicates an increase in crystallinity and leads to a decrease in flexibility and a decrease in low-temperature characteristics of the polymer composition.

The ethylene.α-olefin copolymer (b) of the invention may be produced by a known method without limitation. For example, it may be produced by copolymerizing ethylene and an α-olefin in the presence of a catalyst which includes a compound of a transition metal such as vanadium, zirconium or titanium, and an organoaluminum compound (an organoaluminum oxy compound) and/or an ionizing ionic compound. For example, such methods are described in WO 00/34420 and JP-A-S62-121710.

The ethylene.α-olefin copolymer (b) of the invention may be a mixture of two or more kinds of ethylene.α-olefin copolymers having different properties such as kinematic viscosity at 100° C. and ethylene content as long as the whole of the ethylene.α-olefin copolymers (b) exhibits a kinematic viscosity at 100° C. in the range of 300 to 5000 mm²/s.

Preferred ranges of the ethylene structural unit contents and the molecular weight distributions of ethylene.α-olefin copolymers (b1) and (b2) are the same as those of the ethylene.α-olefin copolymer (b). The proportions of the ethylene.α-olefin copolymers (b1) and (b2) may be varied without limitation as long as the prescribed properties of the ethylene.α-olefin copolymer (b) are satisfied.

Oligomers of higher α-olefins are used as synthetic lubricating oil bases in industry, although such liquid poly-α-olefins are outside the scope of the invention. However, such higher poly-α-olefins do not have continuous methylene chains and hence their structure is dissimilar to the structure resulting from the hydrogenation of the aliphatic double bonds in the polymer segment (B) of the (A)/(B) block copolymer (a). This fact makes the formation of entanglements of the (A)/(B) block copolymer and poly-α-olefins difficult, and thus the vibration damping performance will not be exhibited as desired. Further, poor anti-bleeding properties will be encountered.

The higher poly-α-olefins described above may be obtained by oligomerization with acid catalysts as described in U.S. Pat. No. 3,780,128, U.S. Pat. No. 4,032,591 and JP-A-H01-163136. Alternatively, such polyolefins may be obtained by methods using catalyst systems including metallocene compounds. Such higher poly-α-olefins are commercially available, with examples including "Spectrasyn", "Spectrasyn Plus", "Spectrasyn Elite" and "Spectrasyn Ultra" from ExxonMobil Chemical, "Durasyn" from Ineos, and "Synton" from Chemtura.

Liquid polybutene is a liquid polymer falling outside the scope of the invention. Liquid polybutene may be generally obtained by polymerizing a C4 hydrocarbon fraction which includes isobutylene, butene-1 and butene-2 obtained by a method such as naphtha cracking, or polymerizing isobutylene obtained by refining the above fraction, under the catalysis of a Friedel-Crafts catalyst such as aluminum chloride, magnesium chloride, boron fluoride or titanium tetrachloride, or a complex compound thereof and also with use of trace water in the reaction system, an organic halide or hydrochloric acid as a cocatalyst or without use of any particular cocatalysts. The liquid polybutene contains a large amount of double bonds and is readily oxidized by heat or sunlight, and thus probably exhibits poor weather resistance. A possible approach to this problem is to hydrogenate part of the double bonds in the liquid polybutene by a known method, for example, by the use of a catalyst such as nickel or nickel molybdate salt catalyst. However, the hydrogenation of all the double bonds entails a high level of technical difficulty and is substantially impossible. Such liquid polybutene is available in the market, with examples including "Nisseki Polybutene" from JX Nippon Oil & Energy Corporation, "Indopol" from Ineos, "Oppanol" from BASF, and "Vistanex" from ExxonMobil Chemical.

The addition of a mineral oil, a higher α-olefin polymer or the like as a softener to a block copolymer such as the component (a) described hereinabove usually results in poor weather resistance at times. Instead of such softeners, the invention involves the ethylene.α-olefin copolymer (b) having a kinematic viscosity at 100° C. of 300 to 5000 mm$^2$/s and an ethylene structural unit content of 30 to 80 mol %. With this configuration, the obtainable polymer composition and vibration dampers exhibit excellent weather resistance.

(c) Polyolefin Resin

Where necessary, the polymer composition of the invention may include a polyolefin resin (c) having a MFR (melt flow rate) of 0.1 to 500 g/10 min.

The polyolefin resin as the optional component (c) in the polymer composition of the invention is a polymer or a copolymer including at least one olefin monomer.

The polyolefin resin with a MFR of 0.1 to 500 g/10 min shows a kinematic viscosity at 100° C. of not less than 20000 mm$^2$/s. Thus, the measurement of the kinematic viscosity at 100° C. is practically difficult. That is, the polyolefin resin (c) in the invention usually has a kinematic viscosity at 100° C. exceeding 5000 mm$^2$/s.

The polyolefin resin (c) in the invention is not particularly limited as long as the polymer is based on an olefin(s) and has a MFR of 0.1 to 500 g/10 min. Various known olefin polymers may be used, with examples including homopolymers and copolymers of α-olefins with 2 to 20 carbon atoms such as ethylene, propylene, butene-1, pentene-1, 4-methyl-1-pentene, hexene-1, heptene-1, octene-1, decene-1, undecene-1, dodecene-1, tridecene-1, tetradecene-1, pentadecene-1, hexadecene-1, heptadecene-1, octadecene-1, nonadecene-1 and eicosene-1. Specific examples include olefin polymers and compositions including two or more kinds of olefin polymers such as high-pressure low-density polyethylene, linear low-density polyethylene (so-called LLDPE), medium-density polyethylene, high-density polyethylene, polypropylene, polypropylene random copolymers, poly(l-butene), poly(4-methyl.1-pentene), low-crystalline or amorphous ethylene.propylene random copolymer, ethylene.butene-1 random copolymer and propylene.butene-1 random copolymer, ethylene.vinyl acetate copolymer (EVA), ethylene.(meth)acrylic acid copolymer and metal salts thereof, and ethylene-cycloolefin copolymers. The polyolefin resin (c) may include a nonconjugated diene as a component copolymerized with the olefin. Specific examples of the nonconjugated dienes include linear nonconjugated dienes such as 1,4-hexadiene, 1,6-octadiene, 2-methyl-1,5-hexadiene, 6-methyl-1,5-heptadiene and 7-methyl-1,6-octadiene, cyclic nonconjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene, and trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. Of these, 1,4-hexadiene and cyclic nonconjugated dienes, in particular dicyclopentadiene and 5-ethylidene-2-norbornene are preferably used. Further, the polymers may be such that the above polyolefin resins are graft modified with polar compounds such as maleic acid and silane compounds. Of the resins described above, polymers and copolymers of α-olefins having 2 to 20 carbon atoms, preferably 2 to 10 carbon atoms are desirable.

The intrinsic viscosity [η] of the polyolefin resin (c) measured at 135° C. in decalin is not particularly limited but is preferably 0.5 dl/g to 5 dl/g. When the intrinsic viscosity [η] measured at 135° C. in decalin is lowered, the mechanical strength of the polymer composition is decreased. An increase in intrinsic viscosity [η] results in a deterioration in molding processability.

Preferred examples of the polyolefin resins (c) include polyethylene, polypropylene and polybutene. In particular, polypropylene resins which are homopolymers or copolymers based on propylene are preferable because the heat resistance and the mechanical strength of the polymer composition may be enhanced and also because the solidification rate may be increased.

Examples of the polypropylene resins include propylene homopolymer and copolymers of propylene with at least one monomer selected from ethylene and α-olefins having 4 to 20 carbon atoms. When the polypropylene resin is a copolymer, the proportion of propylene-derived structural units is preferably not less than 90 mol %, and more preferably 93 to 99 mol %.

In the invention, the MFR (melt flow rate) of the polyolefin resin (c) is a value measured in accordance with JIS K7210. For polyethylene (ethylene-based polymer or copolymer), this parameter indicates a value measured at 190° C. under 2.16 kg load. In the case of polyolefin resins other than polyethylene such as polypropylene, this parameter is a value measured at 230° C. under 2.16 kg load.

The polyolefin resin (c) in the invention may be a mixture of two or more polyolefin resins belonging to different types or having different properties such as MFR.

Polymer Composition

The polymer composition of the invention essentially includes the aforementioned component (a) ((a) the block copolymer including a polymer segment mainly derived from a vinyl aromatic compound and a polymer segment mainly derived from a conjugated diene compound, or a hydrogenated product of the copolymer) and the aforementioned component (b) ((b) the ethylene.α-olefin copolymer having a kinematic viscosity at 100° C. of 300 to 5000 mm$^2$/s and an ethylene structural unit content of 30 to 80 mol %), and optionally includes the aforementioned component (c) ((c) the polyolefin resin having a MFR of 0.1 to 500 g/10 min).

The polymer composition of the invention contains the component (b) in an amount of 30 to 200 parts by weight, and preferably 50 to 150 parts by weight per 100 parts by weight of the component (a).

The polymer composition contains the component (c) in an amount of 0 to 100 parts by weight, preferably 1 to 80 parts by weight, and more preferably 10 to 60 parts by weight per 100 parts by weight of the component (a).

By virtue of the content of the component (b) being 30 parts by weight or more per 100 parts by weight of the component (a), the effect of the component (b) in improving vibration damping properties is obtained sufficiently. Limiting the content thereof to 200 parts by weight or less is advantageous in that the occurrence of the bleeding out of the polymer composition is reduced. The addition of the component (c) is advantageous in that the heat resistance, the mechanical strength and the solidification rate of the polymer composition are enhanced.

The polymer composition of the invention may contain components other than the aforementioned components (a), (b) and (c) while still achieving the object of the invention. Examples of the additional components which may be added to the polymer composition of the invention include resin components other than the aforementioned (a), (b) and (c), various weathering stabilizers, heat stabilizers, antioxidants, UV absorbers, antistatic agents, antislip agents, antiblocking agents, antifogging agents, nucleating agents, lubricants, pigments, dyes, antiaging agents, hydrochloric acid absorbers, inorganic or organic fillers, organic or inorganic foaming agents, crosslinking agents, co-crosslinking agents, crosslinking auxiliaries, self-adhesive agents, softeners and flame retardants.

Of the fillers, inorganic fillers are preferable. Examples include powdery fillers such as mica, carbon black, silica, calcium carbonate, talc, graphite, stainless steel and aluminum; and fibrous fillers such as glass fibers and metal fibers. In particular, mica is preferable due to its effect in enhancing damping properties. The content of a filler in the polymer composition of the invention is desirably not more than 150 parts by weight, and preferably about 30 to 100 parts by weight per 100 parts by weight of the total of the components (a), (b) and (c).

The polymer composition of the invention may be produced by kneading the aforementioned components by a known method. The kneading is performed after a mixing step or without a mixing step. The mixing step may be performed by mixing the components for the composition at the same time or successively. Examples of the mixing machines include Plastomill mixers, Henschel mixers, twin-cylinder mixers, ribbon blenders, tumbler blenders, kneaders and Kneader-Ruder machines. The kneading may adopt a method in which the components are melt kneaded in a kneading device such as a single-screw extruder, a twin-screw extruder, a Plastomill mixer, a kneader, a Kneader-Ruder machine or a Banbury mixer, and the kneadate is pelletized, shaped or crushed. During the kneading, the components for the composition may be added to the kneading device simultaneously or successively, or may be added at one time as a mixture obtained by the mixing step.

In the polymer composition of the invention, the loss tangent tan $\delta$ (E''/E') of dynamic viscoelasticity measured in tensile mode at 0° C. and a frequency of 1 Hz is preferably not less than 0.10, more preferably not less than 0.15, and still more preferably not less than 0.20. The composition tends to absorb more energy, to have a lower impact resilience coefficient and to exhibit a higher vibration damping effect with increasing value of the loss tangent tan $\delta$. Specifically, the loss tangent tan $\delta$ may be determined by a measurement method described later. The polymer composition of the invention has an excellent vibration damping effect and is used particularly suitably as a vibration damper and a raw material therefor. When the loss tangent tan $\delta$ is 0.10 or more, the polymer composition advantageously exhibits an excellent vibration damping effect.

The upper limit of the loss tangent tan $\delta$ value is not particularly limited but may be, for example, 5.00 or 3.00. Practically, a sufficient damping effect may be obtained even when the upper limit is 2.00.

The polymer composition of the invention has excellent flexibility and transparency. Further, the composition is more resistant to weathering and can maintain an excellent hue over a longer period of time than conventional polymer compositions containing such softeners as mineral oils or liquid polybutenes. The degree of cloudiness (haze) may be used as an indicator of transparency. Although the upper limit of the haze is not particularly limited, an excellent appearance may be advantageously obtained when the haze is preferably not more than 90, more preferably not more than 80, and still more preferably not more than 50. The hue change ($\Delta YI$) between before and after a weathering test may be used as an indicator of weather resistance. Although the upper limit of the $\Delta YI$ is not particularly limited, excellent weather resistance may be advantageously obtained when the value is preferably not more than 5, more preferably not more than 4, and still more preferably not more than 3.

The polymer composition of the invention not only has excellent vibration damping properties but also has excellent properties such as vibration insulating properties, sound absorbing properties, environmental friendliness, molding processablity, heat resistance, flexibility, rubber elasticity, tack-free properties and durability.

The polymer composition of the invention may be used in various applications without limitation. By virtue of its excellent vibration damping effect, the polymer composition may be suitably used for the fabrication of products such as vibration dampers, vibration insulators, sound absorbers and sound insulators, and may be used particularly suitably as a raw material for producing vibration dampers.

Shaped Articles

The polymer composition of the invention described hereinabove may be used in the form of shaped articles by being shaped appropriately by conventional methods. Examples of the shaping methods include injection molding, various extrusion processes, compression molding, calendering and vacuum forming. The shaped articles may be produced as foams by the use of a known chemical foaming agent or a known physical foaming agent such as carbon dioxide gas, nitrogen gas or water that is allowed to form bubbles by a known method during the shaping.

The polymer composition may be used in combination with a support made of a hard resin or a metal. The hard resins are not particularly limited, and use is possible of polyolefins such as polypropylene, polyethylene and polybutene, and engineering plastics such as polyamide, polycarbonate, polyethylene terephthalate, polyacetal, polyphenylene ether, polybutylene terephthalate, polysulfone and polyimide. The metals are not particularly limited and may be appropriately selected from, for example, cold-rolled steel sheets, galvanized steel sheets, aluminum/zinc alloy-plated steel sheets, stainless steel sheets, aluminum sheets, aluminum alloy sheets, magnesium sheets and magnesium alloy sheets. Injection molded magnesium is also usable.

The polymer composition may be combined with the support by a conventional shaping method such as injection molding or extrusion without limitation. For example, a two-color injection molding method may be adopted in which the molten hard resin as the support is injection molded into a mold and thereafter the molten polymer composition of the invention is injection molded thereon to stack the polymer composition onto the surface of the hard resin article. Another option is an insert molding method in which the molten hard resin is injection molded into a mold and the molded article is inserted into another mold, and thereafter the molten polymer composition of the invention is injection molded onto the surface to stack the polymer composition onto the surface of the plastic article. Alternatively, the metal support may be inserted into a mold and the molten polymer composition of the invention may be injection molded onto the surface of the support to stack the polymer composition onto the surface of the plastic article. Still alternatively, a two-color extrusion method may be adopted in which the support and the inventive polymer composition are extruded concurrently into a stack with use of an apparatus having a plurality of extruders. Further alternatively, a shaped article of the polymer composition may be fixed to the surface of the support with any of various adhesives.

The shapes and the applications of the shaped articles obtained from the polymer composition of the invention are not particularly limited. However, the shaped articles may be suitably used for applications such as vibration dampers, vibration insulators, sound absorbers and sound insulators, and may be used particularly suitably as vibration dampers.

〈Vibration Damper〉

The vibration damper of the invention is formed from the polymer composition of the invention described hereinabove. The vibration damper of the invention may be formed from the inventive polymer composition alone or may be formed from a combination of the inventive polymer composition with any other materials.

The polymer composition of the invention, and the vibration damper formed from the polymer composition may be suitably used for the purpose of damping and insulating vibrations in various applications such as automobiles, railroads, aircrafts, ships, electric and electronic equipment, information-related equipment, acoustic equipment such as speakers, and printing equipment such as printers. In particular, they may be suitably used as vibration dampers and vibration insulators for automobiles. For example, enhanced damping of the vibration of tires contributes to driving stability.

EXAMPLES

The present invention will be described in greater detail based on Examples hereinbelow. However, the scope of the invention is not limited to such Examples.

In Examples and Comparative Examples described below, properties were measured or evaluated by the following methods.

[Ethylene Content, Propylene Content and Blockness (B Value)]

Ethylene.propylene copolymers obtained in Production Examples were analyzed by $^{13}$C-NMR using the apparatus and the conditions described below to determine the ethylene content, the propylene content and the blockness (B value).

Nuclear magnetic resonance apparatus ECP500 manufactured by JEOL Ltd. was used. The solvent was an orthodichlorobenzene/deuterated benzene (80/20 vol %) mixture solvent. The sample concentration was 55 mg/0.6 mL. The measurement temperature was 120° C. The nucleus observed was $^{13}$C (125 MHz). The sequence was single pulse proton decoupling. The pulse width was 4.7 μsec (45° pulse). The repetition time was 5.5 sec. The number of scans was at least 10,000. The reference chemical shift was 27.50 ppm.

The B value is a parameter showing the randomness of the comonomer sequence distribution, and is preferably in the range of 1.0 to 1.4. The B value indicates the composition distribution of structural units in sequences forming the copolymer, and may be calculated using the following equation.

$$B \text{ value} = POE/(2PO \cdot PE)$$

(In the equation, PE and PO are the molar fractions of ethylene components and α-olefin components, respectively, present in the ethylene.α-olefin random copolymer, and POE is the proportion of the number of ethylene.α-olefin alternate sequences relative to all the dyad sequences.)

The ethylene content, the propylene content and the PE, PO and POE values may be determined with respect to a $^{13}$C-NMR spectrum recorded as described above, based on reports by G. J. Ray (Macromolecules, 10, 773 (1977)), J. C. Randall (Macro-molecules, 15, 353 (1982)), and K. Kimura (Polymer, 25, 4418 (1984)).

[Kinematic Viscosity]

The measurement was performed with automated viscometer CAV-4 manufactured by Canon Inc. based on ASTM D 445.

[Loss Tangent (tan δ)]

A pressed sheet 1 mm in thickness was prepared and was cut to give a 5 mm wide rectangular sample for dynamic viscoelasticity measurement. The dependence of dynamic viscoelasticity on temperature was measured by heating the sample from −60 to 150° C. at a frequency of 1 Hz and a heating rate of 3° C./min with use of RSA-III manufactured by TA Instruments. The value of loss tangent (tan δ) ascribed to the glass transition temperature was measured, and the value of tan δ at 0° C. was determined.

[Degree of Cloudiness (Haze)]

The haze (%) of a 2 mm thick pressed sheet in cyclohexane solvent was measured with Haze Meter manufactured by Tokyo Denshoku Co., Ltd.

[Yellowness Index (YI Value)]

The YI value of a 2 mm thick pressed sheet was measured by a transmission method with spectrocolorimeter SE2000 (manufactured by NIPPON DENSHOKU INDUSTRIES CO., LTD.). Specifically, the YI value (YI-2) was measured after a 75-hour weathering test had been performed based on JIS K5400 with use of a sunshine carbon arc weatherometer (SWOM) under the conditions in which the block panel temperature was 63° C., the water spraying time was 18 minutes and the illumination time was 120 minutes. The difference from the YI value (YI-1) before the weathering test was obtained, namely, (YI-2)−(YI-1)=ΔYI. A smaller difference indicates smaller coloration and higher weather resistance.

[Molecular Weight (Mw, Mn) and Molecular Weight Distribution (Mw/Mn)]

(Method A): Measurement for Hydrogenated A/B Block Copolymers (a) and in Production Example 8

The molecular weight was measured with liquid chromatograph ALC/GPC 150-C plus (differential refractometer detector) manufactured by Waters. Two GMH6-HT columns and two GMH6-HTL columns manufactured by TOSOH CORPORATION were connected in series. The mobile phase medium was o-dichlorobenzene. The flow rate was 1.0 ml/min, and the temperature was 140° C.

The resultant chromatogram was analyzed by a known method with reference to a calibration curve recorded with respect to standard polystyrene samples, thereby calculating Mw/Mn. The measurement time per sample was 60 minutes.
(Method B): Measurement in Production Examples 1 to 7

The molecular weight and the molecular weight distribution were determined by GPC measurement using a network composed of the following liquid chromatography pump, sampling device, gel permeation chromatography (GPC) columns and differential refractive index detector (RI detector). Liquid chromatograph: 515 HPLC Pump manufactured by Waters Sampling device: 717 plus Autosampler manufactured by Waters Mobile phase: THF (containing a stabilizer, liquid chromatography grade)
Columns: One MIXED-D column manufactured by PL and one 500 Å column manufactured by PL were connected in series.
Sample concentration: 5 mg/mL
Mobile phase flow rate: 1.0 mL/min
Measurement temperature: normal temperature
Calibration standard sample: EasiCal PS-1 manufactured by PL
[Intrinsic Viscosity [η] at 135° C. in Decalin]

The intrinsic viscosity [η] (dl/g) was measured at a temperature of 135° C. in decalin as a measurement solvent with use of an automated intrinsic viscometer manufactured by RIGO CO., LTD.

Production Example 1

A 2 L-volume continuous polymerizer equipped with a stirring blade and thoroughly purged with nitrogen was loaded with 1 L of dehydrated and purified hexane. Subsequently, a 96 mmol/L hexane solution of ethylaluminum sesquichloride ($Al(C_2H_5)_{1.5}.Cl_{1.5}$) was continuously fed at a rate of 500 ml/h for 1 hour. Further, there were continuously fed a 16 mmol/L hexane solution of $VO(OC_2H_5)Cl_2$ as a catalyst at a rate of 500 ml/h, and hexane at a rate of 500 ml/h. At the same time, the polymerization liquid was continuously withdrawn from an upper portion of the polymerizer so that the volume of the polymerization liquid in the polymerizer was kept constant at 1 L. Next, 47 L/h ethylene gas, 47 L/h propylene gas and 20 L/h hydrogen gas were supplied through bubbling tubes. The copolymerization reaction was performed at 35° C. while circulating a refrigerant through a jacket fitted to the exterior of the polymerizer.

In the above manner, a polymerization solution including an ethylene.propylene copolymer was obtained. The polymerization solution obtained was deashed with hydrochloric acid and was poured into a large amount of methanol to precipitate the ethylene.propylene copolymer. Vacuum drying at 130° C. for 24 hours afforded an ethylene.propylene copolymer (b-1). The results of the analysis of the copolymer (b-1) are described in Table 1.

Production Examples 2 to 7

Ethylene.propylene copolymers described in Table 1 were obtained in the same manner as in Production Example 1, except that the rates of the supply of ethylene gas, propylene gas and hydrogen gas were changed appropriately. The results of the analysis of the ethylene.propylene copolymers are described in Table 1.

Production Example 8

An ethylene.propylene copolymer (b'-8) was obtained in the same manner as the method described in Example 2 of JP-A-H06-263821. The results of the analysis of the copolymer (b'-8) are described in Table 1. The measurement of kinematic viscosity at 100° C. was infeasible (20,000 $mm^2$/s or above).

TABLE 1

| | Prod. Ex. 1 | Prod. Ex. 2 | Prod. Ex.3 | Prod. Ex. 4 | Prod. Ex. 5 | Prod. Ex. 6 | Prod. Ex. 7 | Prod. Ex. 8 |
|---|---|---|---|---|---|---|---|---|
| Ethylene · propylene copolymer | b-1 | b-2 | b-3 | b-4 | b-5 | b'-6 | b'-7 | b'-8 |
| Ethylene content (mol %) | 53 | 53 | 53 | 73 | 57 | 53 | 53 | 82.6 |
| Propylene content (mol %) | 47 | 47 | 47 | 27 | 43 | 47 | 47 | 17.4 |
| Kinematic viscosity at 100° C. ($mm^2$/s) | 2048 | 1161 | 615 | 3410 | 3460 | 39.6 | 150 | Could not be measured. |
| Molecular weight distribution (Mw/Mn) | 1.8 | 1.8 | 1.7 | 1.9 | 1.8 | 1.6 | 1.6 | 2.1 |
| Intrinsic viscosity [η] (dl/g) | 0.19 | 0.16 | 0.14 | 0.23 | 0.23 | 0.06 | 0.09 | 1.25 |
| B value | 1.2 | 1.2 | 1.2 | 1.1 | 1.2 | 1.2 | 1.2 | — |

Example 1

As the block copolymer or hydrogenated product thereof (a), 100 parts by weight of polystyrene-poly(ethylene/propylene)-polystyrene block copolymer (SEPS) (a-1) was used. As the ethylene.α-olefin copolymer (b), 100 parts by weight of the ethylene.propylene copolymer (b-3) obtained in Production Example 3 was used. They were mixed together and were melt kneaded with Labo Plastomill (a twin-screw batchwise melt kneader) manufactured by Toyo Seiki Seisaku-Sho, Ltd. at a preset temperature of 200° C., with a resin feed of 50 g (kneader volume per batch=60 $cm^3$) and at 50 rpm for 15 minutes. The resultant resin composition was preheated at 200° C. for 5 minutes, pressed at 200° C. for 3 minutes and cooled at 10° C. for 5 minutes. In this manner, a polymer composition (1) was obtained as a sheet.

The sheet was tested to measure the various properties. The results are described in Table 2.

Examples 2 to 11 and Comparative Examples 1 to 10

Pressed sheets of polymer compositions were obtained in the same manner as in Example 1, except that the types and the amounts of the components that were melt kneaded were changed as described in Table 2 to Table 4.

The sheets were tested to measure the various properties. The results are described in Table 2 to Table 4.

The components used in Examples and Comparative Examples (Table 2 to Table 4) are listed below.

a-1: polystyrene-poly(ethylene/propylene)-polystyrene block copolymer (SEPS) (SEPTON (trademark) 2007, manufactured by KURARAY CO., LTD., styrene content: 30 wt %, $MFR_{230°C.}$=2.4 g/10 min, Mw=80,000)

a-2: polystyrene-poly(ethylene/butylene)-polystyrene block copolymer (SEBS) (SEPTON (trademark) 8007, manufactured by KURARAY CO., LTD., styrene content: 30 wt %, $MFR_{230°C.}$=2 g/10 min, Mw of copolymer=90,000)

b-1 to b-5, and b'-6 to b'-8: as described in Table 1 c-1: homopolypropylene (manufactured by Prime Polymer Co., Ltd., Prime Polypro (trademark) J105G, $MFR_{230°C.}$=10 g/10 min)

PW-380: paraffinic process oil (manufactured by Idemitsu Kosan Co., Ltd., Diana Process Oil PW-380, kinematic viscosity at 100° C.=30 $mm^2/s$)

Higher poly-α-olefin-1: (manufactured by ExxonMobil Chemical, Spectra Syn (trademark) 40, kinematic viscosity at 100° C.=40 $mm^2/s$)

Higher poly-α-olefin-2: metallocene-polymerized product (manufactured by ExxonMobil Chemical, Spectra Syn Elite (trademark) 65, kinematic viscosity at 100° C.=65 $mm^2/s$)

Higher poly-α-olefin-3: (manufactured by ExxonMobil Chemical, Spectra Syn Ultra (trademark) 1000, kinematic viscosity at 100° C.=1000 $mm^2/s$)

Liquid polybutene: (manufactured by JX Nippon Oil & Energy Corporation, Nisseki Polybutene (trademark) 1900, kinematic viscosity at 100° C.=3710 $mm^2/s$)

TABLE 2

| | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| Composition (parts by weight) | a-1 (SEPS) | 100 | 100 | 100 | 100 | 100 | 100 | 100 | 100 |
| | b-1 | | | | 50 | 100 | | | 20 |
| | b-2 | | 100 | | | | | | |
| | b-3 | 100 | | | | | | | |
| | b-4 | | | | | | 100 | | |
| | b-5 | | | | | | | 100 | |
| Characteristics | Loss tangent (tanδ) | 0.16 | 0.21 | 0.14 | 0.24 | 0.18 | 0.29 | 0.05 | 0.08 |
| | Cloudiness (haze) (%) | 20 | 20 | 23 | 20 | 96 | 72 | 28 | 27 |
| | ΔYI | 1.0 | 1.1 | 1.4 | 1.2 | 1.6 | 0.2 | 6.2 | 3.0 |

TABLE 3

| | | Ex. 7 | Ex. 8 | Comp. Ex. 3 | Comp. Ex. 4 | Comp. Ex. 5 | Comp. Ex. 6 |
|---|---|---|---|---|---|---|---|
| Composition (parts by weight) | a-1 (SEPS) | 100 | 100 | 100 | 100 | 100 | 100 |
| | b-1 | 100 | 100 | | | | |
| | b'-6 | | | 100 | | | |
| | b'-7 | | | | 100 | | |
| | b'-8 | | | | | 100 | |
| | c-1 (PP) | 20 | 40 | | | | |
| | Paraffinic process oil (PW-380) | | | | | | 100 |
| Characteristics | Loss tangent (tanδ) | 0.25 | 0.19 | 0.05 | 0.07 | 0.05 | 0.04 |
| | Cloudiness (haze) (%) | | | 20 | 20 | 98 | 20 |
| | ΔYI | 1.3 | 1.3 | 0.7 | 0.8 | | 5.4 |

TABLE 4

| | | Ex. 9 | Ex. 10 | Ex. 11 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|
| Composition (parts by weight) | a-1 (SEPS) | | | | | | 100 | 100 | 100 | 100 |
| | a-2 (SEBS) | 100 | 100 | 100 | 100 | 100 | | | | |
| | b-1 | | 100 | | | | | | | |
| | b-4 | | | 100 | | | | | | |

TABLE 4-continued

| | | Ex. 9 | Ex. 10 | Ex. 11 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|
| | b-5 | | | 100 | | | | | | |
| | b'-6 | | | | 100 | | | | | |
| | Higher poly-α-olefin-1 | | | | | 100 | | | | |
| | Higher poly-α-olefin-2 | | | | | | 100 | | | |
| | Higher poly-α-olefin-3 | | | | | | | 100 | | |
| | Liquid polybutene | | | | | | | | | 100 |
| Characteristics | Loss tangent (tanδ) | 0.16 | 0.17 | 0.19 | 0.06 | 0.05 | 0.04 | 0.08 | Could not be shaped. | 0.22 |
| | Cloudiness (haze) (%) | 20 | 20 | 20 | 20 | 30 | 20 | 20 | | 50 |
| | ΔYI | | | | | | 5.5 | | | 4.3 |

Of the polymer compositions of Examples and Comparative Examples, those compositions composed of 100 parts by weight of a-1 as the component (a) and 100 parts by weight of the component (b) will be discussed with reference to FIG. 1 which is a graph plotting loss tangent tan δ versus kinematic viscosity of the ethylene.α-olefin copolymer (b) at 100° C. In the graph, the ordinate indicates tan δ (no unit) of the polymer composition, and the abscissa indicates the kinematic viscosity (mm²/s) of the ethylene.α-olefin copolymer (b) at 100° C. From the graph, it is shown that the loss tangent tan δ is increased markedly and the composition achieves excellent vibration damping properties when the kinematic viscosity of the ethylene.α-olefin copolymer (b) at 100° C. exceeds 300 mm²/s.

In Comparative Examples 3 and 4, the kinematic viscosity of the ethylene.α-olefin copolymer (b) at 100° C. was less than 300 mm²/s. Consequently, the loss tangent tan δ was low and sufficient vibration damping properties were not obtained. Comparative Example 5 which involved an ethylene.α-olefin copolymer (b) having a kinematic viscosity at 100° C. of above 5000 mm²/s resulted not only in insufficient vibration damping properties but also in poor transparency.

In Comparative Examples 9 and 10 which involved a higher poly-α-olefin, the loss tangent tan δ was low and sufficient vibration damping properties were not obtained. In Comparative Example 11, the liquid higher poly-α-olefin and the component a-1 (SEPS) failed to form a homogeneous mass even after the kneading, and the composition could not be formed into a pressed sheet due to the occurrence of heavy bleedout. This failure is probably ascribed to poor compatibility between the poly-α-olefin and the block copolymer (a). In Comparative Example 12 which used a liquid polybutene, tan δ was large and vibration damping properties were exhibited, but the weather resistance was markedly decreased probably by the influence of the double bonds in the polybutene.

INDUSTRIAL APPLICABILITY

The polymer compositions of the invention, and the vibration dampers formed from the polymer compositions may be suitably used for the purpose of damping and insulating vibrations in various applications such as automobiles, railroads, aircrafts, ships, electric and electronic equipment, information-related equipment, acoustic equipment such as speakers, printing equipment such as printers, and tires.

The invention claimed is:

1. A vibration damper formed from a polymer composition, the polymer composition comprising:
   (a) 100 parts by weight of a block copolymer including a polymer segment mainly derived from a vinyl aromatic compound and a polymer segment mainly derived from a conjugated diene compound, or a hydrogenated product of the copolymer,
   (b) 50 to 150 parts by weight of an ethylene.α-olefin copolymer having a kinematic viscosity at 100° C. of 300 to 5000 mm²/s and an ethylene structural unit content of 30 to 80 mol %, and
   (c) 1 to 60 parts by weight of a polyolefin resin having a MFR of 0.1 to 500 g/10 min.

2. The vibration damper according to claim 1, wherein the loss tangent tan δ of the dynamic viscoelasticity of the polymer composition measured at 0° C. and a frequency of 1 Hz is not less than 0.10.

3. The vibration damper according to claim 1, wherein the block copolymer or the hydrogenated product thereof (a) is a hydrogenated product of a block copolymer including a polymer segment mainly derived from a vinyl aromatic compound and a polymer segment mainly derived from a conjugated diene compound.

4. The vibration damper according to claim 1, wherein the kinematic viscosity of the ethylene.α-olefin copolymer (b) at 100° C. is 500 to 3500 mm²/s.

5. The vibration damper according to claim 1, wherein the polyolefin resin (c) is a polypropylene resin.

6. A polymer composition comprising:
   (a) 100 parts by weight of a block copolymer including a polymer segment mainly derived from a vinyl aromatic compound and a polymer segment mainly derived from a conjugated diene compound, or a hydrogenated product of the copolymer,
   (b) 50 to 150 parts by weight of an ethylene.α-olefin copolymer having a kinematic viscosity at 100° C. of 300 to 5000 mm²/s and an ethylene structural unit content of 30 to 80 mol %, and
   (c) 1 to 60 parts by weight of a polyolefin resin having a MFR of 0.1 to 500 g/10 min,
   the polymer composition having a loss tangent tan δ of dynamic viscoelasticity measured at 0° C. and a frequency of 1 Hz of not less than 0.10.

7. The polymer composition according to claim 6, which is used for the formation of a vibration damper.

8. The polymer composition according to claim 6, wherein the block copolymer or the hydrogenated product thereof (a) is a hydrogenated product of a block copolymer including a polymer segment mainly derived from a vinyl aromatic compound and a polymer segment mainly derived from a conjugated diene compound.

9. The polymer composition according to claim 6, wherein the kinematic viscosity of the ethylene.α-olefin copolymer (b) at 100° C. is 500 to 3500 mm²/s.

10. The polymer composition according to claim 6, wherein the polyolefin resin (c) is a polypropylene resin.

* * * * *